(12) United States Patent
Stephens (10) Patent No.: US 10,178,202 B2
(45) Date of Patent: *Jan. 8, 2019

(54) RELOCATION OF APPLICATIONS TO OPTIMIZE RESOURCE UTILIZATION

(71) Applicant: AT&T Intellectual Property I, L.P., Atlanta, GA (US)

(72) Inventor: Robert Todd Stephens, Fayetteville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,155

(22) Filed: Jun. 1, 2018

(65) Prior Publication Data

US 2018/0278720 A1 Sep. 27, 2018

Related U.S. Application Data

(63) Continuation of application No. 14/512,617, filed on Oct. 13, 2014, now Pat. No. 9,992,304.

(51) Int. Cl.
| | |
|---|---|
| *G06F 15/173* | (2006.01) |
| *H04L 29/08* | (2006.01) |
| *G06F 9/50* | (2006.01) |
| *G06F 9/455* | (2018.01) |

(52) U.S. Cl.
CPC .......... *H04L 67/34* (2013.01); *G06F 9/45558* (2013.01); *G06F 9/5088* (2013.01); *G06F 2009/4557* (2013.01)

(58) Field of Classification Search
CPC .. H04L 47/00; H04L 67/34; G06F 2009/4557
USPC ......................................................... 709/226
See application file for complete search history.

(56) References Cited

U.S. PATENT DOCUMENTS

| | | | |
|---|---|---|---|
| 6,058,424 | A | 5/2000 | Dixon et al. |
| 7,219,347 | B1 | 5/2007 | Waddington |
| 7,565,441 | B2 | 7/2009 | Romanik et al. |
| 8,266,254 | B2 | 9/2012 | Garrison et al. |

(Continued)

OTHER PUBLICATIONS

Hung et al., "Executing mobile applications on the cloud: Framework and issues," Computers and Mathematics with Applications, Jan. 2012, vol. 63, Issue 2, pp. 573-587.

(Continued)

*Primary Examiner* — Joseph E Avellino
*Assistant Examiner* — Patrick F Ngankam
(74) *Attorney, Agent, or Firm* — Hartman & Citrin LLC (57) ABSTRACT

Concepts and technologies are disclosed herein for relocation of applications to optimize resource utilization. A processor executing a relocation management application can receive a request to relocate an application. The processor can identify a utilization associated with the application, identify prospective host resources capable of hosting the application, determine utilizations associated with the prospective host resources, and project prospective host resource utilizations based upon the utilization associated with the application and the utilizations associated with the prospective host resources. The processor can select a prospective host resource from the prospective host resources by selecting a resource that offers a most consistent projected utilization.

20 Claims, 6 Drawing Sheets

(56) References Cited

U.S. PATENT DOCUMENTS

| | | | |
|---|---|---|---|
| 8,307,362 B1 | 11/2012 | Gong et al. | |
| 8,495,627 B2 | 7/2013 | Barsness et al. | |
| 8,516,487 B2 * | 8/2013 | Felton | G06F 9/4856 718/102 |
| 8,572,621 B2 | 10/2013 | Takai | |
| 8,615,589 B1 | 12/2013 | Adogla et al. | |
| 8,719,627 B2 * | 5/2014 | Watson | G06F 11/3442 714/13 |
| 8,788,663 B1 | 7/2014 | Adogla et al. | |
| 2007/0271560 A1 * | 11/2007 | Wahlert | G06F 8/61 718/1 |
| 2010/0049851 A1 | 2/2010 | Garrison | |
| 2013/0179882 A1 | 7/2013 | Lemay et al. | |
| 2014/0195759 A1 | 7/2014 | Gantman et al. | |

OTHER PUBLICATIONS

U.S. Office Action dated Jun. 29, 2016 in U.S. Appl. No. 14/512,617.
U.S. Office Action dated Jan. 4, 2017 in U.S. Appl. No. 14/512,617.
U.S. Notice of Allowance dated Jan. 12, 2018 in U.S. Appl. No. 14/512,617.

* cited by examiner

RELOCATION OF APPLICATIONS TO OPTIMIZE RESOURCE UTILIZATION

CROSS-REFERENCE TO RELATED APPLICATIONS

This application is a continuation of and claims priority to U.S. patent application Ser. No. 14/512,617, entitled "Relocation of Applications to Optimize Resource Utilization," filed Oct. 13, 2014, now U.S. Pat. No. 9,992,304, which is incorporated herein by reference in its entirety.

BACKGROUND

Virtualization of communications networks can be used to allow hardware and software to be decoupled from one another. Decoupling hardware and software can be used to give networks, network operators, network engineers, and/or other entities greater flexibility with regard to application placement, hardware placement, and the like. In particular, some network functions traditionally may have been tightly coupled to specific hardware. For example, routing functions may be tightly coupled to hardware such as a hardware router.

Modern trends in networking, however, may allow these functions and their corresponding hardware to be decoupled from one another. Thus, a generic server computer may host a virtual machine, and a function for a particular service or function can be loaded to and/or hosted by the server computer to provide the functionality associated with the previously-tightly-coupled-together hardware and software.

Because of the flexibility that may be granted by virtualization, network operators and/or planners may relocate applications, services, or other functionality from time to time for various purposes. For example, if demand for a service exceeds capabilities of hardware resources currently allocated to support the functionality, the service may be moved to other resources, the resources may be scaled, or the like. Scaling resources, relocating services, and/or instantiating new resources to support a service or other functionality can be expensive in terms of computing power, storage resources, bandwidth, or the like. Thus, network operators and/or other entities may attempt to carefully select hardware resources to host applications or other functionality before instantiating the resources to reduce costs associated with those resources and/or applications.

SUMMARY

The present disclosure is directed to relocation of applications to optimize resource utilization. A server computer can execute a relocation management application. The server computer can be configured, via execution of the relocation management application, to provide the functionality illustrated and described herein for relocating applications to optimize resources. In various embodiments, the server computer can receive a request to relocate an application. The request can be received at the server computer as a program or function call, as an explicit request, combinations thereof, or the like.

In response to receiving the request, the server computer can obtain utilization data. The utilization data can indicate a load and/or utilization (e.g., processor consumption, storage consumption, bandwidth consumption, and/or other needs) associated with the application. The load and/or utilization can be determined by obtaining information relating to the host resource, in some embodiments. The server computer can identify prospective host resources from any number of resources. The server computer can identify the prospective host resources as resources that are capable of hosting the application. The server computer can determine a utilization and/or load associated with the prospective host resources identified by the server computer.

The server computer can project utilization, load, or other performance metrics such as bandwidth, compute resources, storage resources, or the like for each of the prospective host resources identified by the server computer. The server computer can analyze the projected utilizations for each of the identified prospective host resources and select the prospective host resources that will host the application. In some embodiments, the server computer can select the prospective host resource that offers the most consistent projected utilization, though this is not necessarily the case. In some embodiments, the server computer can select the resource that offers the most consistent projected utilization because this prospective host resource may be the easiest or cheapest to operate and may reduce or eliminate expensive scaling or instantiation of resources, which may be expensive.

According to one aspect of the concepts and technologies disclosed herein, a method is disclosed. The method can include receiving, at a processor executing a relocation management application, a request to relocate an application. The method also can include identifying, by the processor, a utilization associated with the application, identifying, by the processor, prospective host resources capable of hosting the application, determining, by the processor, utilizations associated with the prospective host resources, projecting, by the processor, prospective host resource utilizations based upon the utilization associated with the application and the utilizations associated with the prospective host resources, and selecting, by the processor, a prospective host resource from the prospective host resources. The prospective host resource can be selected as a resource that offers a most consistent projected utilization.

In some embodiments, the application can be executed by a host resource, and the utilization can include a utilization of the host resource. In some embodiments, the request can be received as a service call by the relocation management application. In some embodiments, the utilization associated with the application can be identified by analyzing utilization data obtained from a resource monitor. In some embodiments, average projected utilizations can be determined for the prospective host resources, and total deviations from the average projected utilizations can be calculated to identify the resource that offers the most consistent projected utilization.

In some embodiments, the method also can include issuing commands to relocate the application to the resource. The commands can include a first command that can be issued to a host resource that executes the application, and a second command that can be issued to the prospective host resource selected. The commands can initiate relocation of the application from the host resource to the resource. In some embodiments, the first command can cause the host resource to store state information associated with the application, and the second command can cause the resource to use the state information to resume execution of the application. In some embodiments, the method also can include storing, at a data store, utilization data relating to the utilization.

According to another aspect of the concepts and technologies described herein, a system is disclosed. The system can include a processor and a memory. The memory can store computer-executable instructions that, when executed by the processor, cause the processor to perform operations. The operations can include receiving a request to relocate an application, identifying a utilization associated with the application, identifying prospective host resources capable of hosting the application, determining utilizations associated with the prospective host resources, projecting prospective host resource utilizations based upon the utilization associated with the application and the utilizations associated with the prospective host resources, and selecting a prospective host resource from the prospective host resources, wherein the prospective host resource is selected as a resource that offers a most consistent projected utilization.

In some embodiments, the application can be executed by a host resource, and the utilization can include a utilization of the host resource. In some embodiments, average projected utilizations can be determined for the prospective host resources, and total deviations from the average projected utilizations can be calculated to identify the resource that offers the most consistent projected utilization. In some embodiments, the computer-executable instructions, when executed by the processor, can cause the processor to perform operations further including issuing commands to relocate the application to the resource.

In some embodiments, the commands can include a first command that can be issued to a host resource that executes the application, and a second command that can be issued to the prospective host resource selected. The commands can initiate relocation of the application from the host resource to the resource. In some embodiments, the first command can cause the host resource to store state information associated with the application, and the second command can cause the resource to use the state information to resume execution of the application.

According to another aspect of the concepts and technologies disclosed herein, a computer storage medium is disclosed. The computer storage medium can have computer-executable instructions stored thereon that, when executed by a processor, cause the processor to perform operations. The operations can include receiving a request to relocate an application, identifying a utilization associated with the application, identifying prospective host resources capable of hosting the application, determining utilizations associated with the prospective host resources, projecting prospective host resource utilizations based upon the utilization associated with the application and the utilizations associated with the prospective host resources, and selecting a prospective host resource from the prospective host resources, wherein the prospective host resource can be selected as a resource that offers a most consistent projected utilization.

In some embodiments, the application can be executed by a host resource, and the utilization can include a utilization of the host resource. In some embodiments, average projected utilizations can be determined for the prospective host resources, and total deviations from the average projected utilizations can be calculated to identify the resource that offers the most consistent projected utilization. In some embodiments, the computer-executable instructions, when executed by the processor, can cause the processor to perform operations further including issuing commands to relocate the application to the resource. In some embodiments, the commands can include a first command that can be issued to a host resource that executes the application, and a second command that can be issued to the prospective host resource selected. The commands can initiate relocation of the application from the host resource to the resource.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to relocation of applications to optimize resource utilization. In practice, a server computer can execute a relocation management application. The server computer can be configured, via execution of the relocation management application, to provide the functionality illustrated and described herein for relocating applications to optimize resources. In various embodiments, the server computer can receive a request to relocate an application. The request can be received at the server computer as program or function call, as explicit requests, combinations thereof, or the like. In response to receiving the request, the server computer can obtain utilization data. The utilization data can indicate a load and/or utilization (e.g., processor consumption, storage consumption, bandwidth consumption, and/or other needs) associated with the application. The load and/or utilization can be determined by obtaining information relating to the host resource, in some embodiments.

The server computer can identify prospective host resources from any number of resources. The server computer can identify the prospective host resources as resources that are capable of hosting the application. The server computer can determine a utilization and/or load associated with the prospective host resources identified by the server computer. The server computer can project utilization, load, or other performance metrics such as bandwidth, compute resources, storage resources, or the like for each of the prospective host resources identified by the server computer. The server computer can analyze the projected utilizations for each of the identified prospective host resources and select the prospective host resources that will host the application. The server computer can select the prospective host resource that offers the most consistent projected utilization, though this is not necessarily the case, as this prospective host resource may be the easiest or cheapest to operate (as scaling resources can be expensive).

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
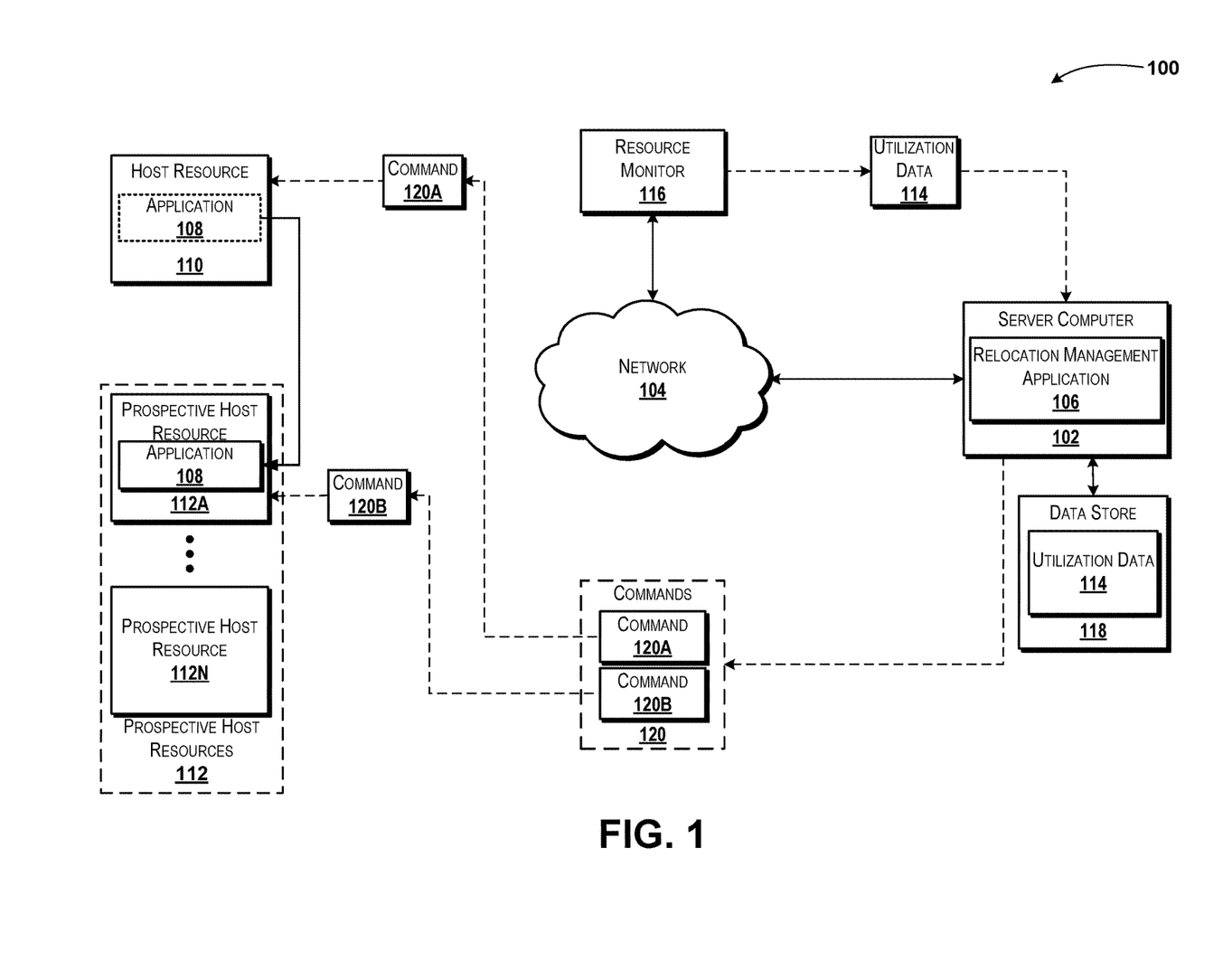
FIG. 1 is a system diagram illustrating an illustrative operating environment for various embodiments of the concepts and technologies described herein.

Referring now to FIG. 1, aspects of an operating environment 100 for various embodiments of the concepts and technologies disclosed herein for relocation of applications to optimize resource utilization will be described, according to an illustrative embodiment. The operating environment 100 shown in FIG. 1 includes a server computer 102. The server computer 102 can operate in communication with and/or as part of a communications network ("network") 104.

According to various embodiments, the functionality of the server computer 102 may be provided by one or more server computers, desktop computers, mobile telephones, laptop computers, set-top boxes, other computing systems, and the like. It should be understood that the functionality of the server computer 102 can be provided by a single device, by two similar devices, and/or by two or more dissimilar devices. For purposes of describing the concepts and technologies disclosed herein, the server computer 102 is described herein as a server computer. It should be understood that this embodiment is illustrative, and should not be construed as being limiting in any way.

The server computer 102 can execute an operating system (not shown in FIG. 1) and one or more application programs such as, for example, a relocation management application 106. The operating system can include a computer program for controlling the operation of the server computer 102. The relocation management application 106 can include an executable program configured to execute on top of the operating system to provide various functionality illustrated and described herein for relocating applications to optimize resource utilization.

In particular, the relocation management application 106 can be configured to relocate an application 108 from a host resource 110 to one of multiple prospective host resources 112A-112N (hereinafter collectively and/or generically referred to as "prospective host resources 112"). In particular, the relocation management application 106 can be configured to detect a request to relocate the application 108. The request to relocate the application 108 can be received at the relocation management application 106 as an explicit command and/or implicitly by the relocation management application 106 detecting a request to analyze an application 108 and/or one or more prospective host resources 112 or the like.

In particular, the relocation management application 106 can detect a request to relocate the application 108, and obtain utilization data 114. The utilization data 114 can be created by a resource monitor 116 or other network device, which can monitor and/or analyze activity associated with one or more of the host resource 110, the prospective host resources 112, and/or the application 108. Additionally, or alternatively, the utilization data 114 can be generated by the host resource 110 and provided to the server computer 102. Because other entities can generate the utilization data 114, it should be understood that these examples are illustrative and therefore should not be construed as being limiting in any way. According to various embodiments, the utilization data 114 can include load and/or utilization information, which can be analyzed by the relocation management application 106 to identify usage and/or consumption associated with the application 108 and/or one or more resources that host (or can host) the application 108.

According to various embodiments, the resource monitor 116 can monitor utilization and/or load associated with the host resource 110 and/or the prospective host resources 112. It can be appreciated that by monitoring the host resource 110, the resource monitor 116 can determine a load or utilization associated with a resource that hosts the application 108. While the host resource 110 may host other applications or modules, the load and/or utilization associated with the application 108 can be determined and/or reported by the host resource 110 and/or the resource monitor 116.

When generating the utilization data 114, the resource monitor 116 and/or the host resource 110 can determine a load and/or utilization at various time increments. Thus, for example, a load and/or utilization can be determined at intervals of one or more milliseconds, one or more seconds, one or more minutes, one or more hours, one or more days, or the like. It can be appreciated that various time intervals may be chosen and/or used based upon fluctuation of load and/or utilization associated with application 108. Similarly, a utilization or load associated with the prospective host resources 112 can be determined and/or reported at various increments such as milliseconds, seconds, minutes, hours, days, or the like.

The server computer 102 can analyze the utilization data 114 associated with the application 108 and/or the prospective host resources 112 to identify one of the prospective host resources 112 that should host the application 108 when the application 108 is relocated. The prospective host resource 112 that should host the application 108 can be identified in various manners. In some embodiments, the prospective host resource 112 that should host the application 108 can be determined by determining which of the prospective host resources 112 would, when hosting the application 108, provide the most consistent utilization and/or load. It should be understood that this example is illustrative and therefore should not be construed as being limiting in any way.

It can be appreciated that selecting the prospective host resource 112 with the most consistent projected load and/or utilization may offer benefits over some other approaches for selecting the prospective host resource 112. In particular, it should be understood that some relocation technologies may rely upon identifying a host with the lowest utilization and/or load. The concepts and technologies described herein, however, can identify a prospective host resource 112 based upon a projected combined load or utilization and/or the associated consistency thereof. In particular, a projected combined load of a prospective host resource 112 and the application 108 can be determined for multiple prospective host resources 112. The projected combined load for two or more prospective host resources 112 (hosting the application 108) can be compared to identify the prospective host resource 112 with a most consistent projected combined load (compared to the other prospective host resources 112).

Thus, while the prospective host resource 112 that is identified as the ideal host may have a total load that is higher than another prospective host resource 112, the consistency of load and/or utilization associated with the identified ideal prospective host resource 112 will be, according to various embodiments of the concepts and technologies described herein, more consistent than projected loads and/or utilizations associated with other prospective host resources 112. These and other aspects of the concepts and technologies described herein for selecting an ideal prospective host resource 112 will be more clearly understood with reference to FIGS. 2-4B below.

According to various embodiments, the server computer 102 can identify the prospective host resource 112 that should host the application 108 based upon analysis of the utilization data 114. In some embodiments, the server computer 102 can store the utilization data 114 at a data storage device such as, for example, a data store 118. According to various embodiments, the functionality of the data store 118 can be provided by one or more databases, server computers, desktop computers, mobile telephones, laptop computers, other computing systems, network devices, and the like. In the illustrated embodiment, the functionality of the data store 118 is provided by a server computer that can host and/or store the utilization data 114. It should be understood that this example is illustrative and therefore should not be construed as being limiting in any way.

The server computer 102 can analyze one or more instances of utilization data 114 for the application 108, the host resource 110, and/or the prospective host resources 112 to identify the prospective host resource 112 that should host the application 108. The server computer 102 also can generate one or more commands 120A-120B (hereinafter collectively and/or generically referred to as "commands 120"). The server computer 102 can issue the commands 120 to the host resource 110 and the prospective host resource 112 that is identified as the prospective host resource 112 that should host the application 108. The commands 120 can include instructions for relocating the application 108 from the host resource 110 to the prospective host resource 112. As shown in the illustrated embodiment of FIG. 1, the commands 120 can be issued to the host resource 110 and the prospective host resource 112A to effect or initiate relocation of the application 108 from the host resource 110 to the prospective host resource 112A. It should be understood that this example is illustrative and therefore should not be construed as being limiting in any way.

In practice, the server computer 102 can receive a request to relocate an application such as the application 108. The request can be received at the server computer 102 via a function, program, or service call, or an explicit request from one or more of an application, a network device, a network operator, a network engineer, a network planning device, or other entity. In response to receiving the request, the server computer 102 can determine a host for the relocated application 108.

In determining the host for the relocated application 108, the server computer 102 can obtain utilization data 114. The utilization data 114 can indicate a load and/or utilization (e.g., processor consumption, storage consumption, bandwidth consumption, and/or other needs) associated with the application 108. The load and/or utilization associated with the application 108 can be determined by the server computer 102 by obtaining information relating to the host resource 110, in some embodiments.

The server computer 102 also can identify prospective host resources 112. The prospective host resources 112 can be identified by locating available host resources in a particular geographic area or region, in a particular section or portion of the network 104, by identifying hosts with available resources, or the like. Thus, the server computer 102 may identify, from any number of resources, prospective host resources 112 that are capable of hosting the application 108 in terms of compute capabilities, storage capabilities, bandwidth and/or data transfer capabilities, combinations thereof, or the like.

The server computer 102 can determine a utilization and/or load associated with the prospective host resources 112 identified by the server computer 102. The server computer 102 can obtain utilization data 114 associated with the prospective host resources 112, for example, or query the prospective host resources 112, which may respond in some embodiments with the utilization data 114 or other information that may indicate loads, utilizations, capabilities, or the like. Thus, the server computer 102 can determine a utilization and/or availability associated with each of the identified prospective host resources 112. It should be understood that this example is illustrative and therefore should not be construed as being limiting in any way.

The server computer 102 can project utilization, load, or other performance metrics such as bandwidth, compute resources, storage resources, or the like for each of the prospective host resources 112 identified by the server computer 102. In projecting the utilization for the prospective host resources 112, the server computer 102 can be configured to model the known utilization associated with the application 108, which may be determined by analyzing the utilization data 114, for example, on top of the known utilization associated with the prospective host resources 112. Thus, for example, if a utilization of one of the prospective host resources 112 at 12:00 AM on a particular date is a value of $x_1$ and a utilization associated with the application 108 at 12:00 AM on the same date is a value of $x_2$, the server computer 102 can calculate the projected utilization at 12:00 AM for that date as being $x_1+x_2$. Because projected utilizations can be determined in additional and/or alternative manners, it should be understood that this example is illustrative and therefore should not be construed as being limiting in any way.

The server computer 102 can analyze the projected utilizations for each of the identified prospective host resources 112 and select the prospective host resource 112 that will host the application 108 as the prospective host resource 112 of the prospective host resources 112 that offers the most consistent projected utilization. It can be appreciated that various embodiments of analyzing the projected utilizations are possible and are contemplated. In some embodiments, the server computer 102 can calculate an average utilization for the prospective host resource 112, and then calculate a total deviation from the average utilization. After repeating this analysis for each of the identified prospective host resources 112, the server computer 102 can select the prospective host resource 112 that has the smallest total deviation from the average, which can indicate a least amount of fluctuation from the average (and therefore a most consistent utilization). Because the prospective host resource 112 can be selected in additional and/or other ways, it should be understood that this example is illustrative and therefore should not be construed as being limiting in any way.

After determining the prospective host resource 112 that should host the application 108, the server computer 102 can issue one or more commands 120 to move the application 108 to the identified prospective host resource 112. In particular, the server computer 102 can issue one or more commands 120 to the host resource 110 to cease execution of the application 108 and/or to release resources used to support the application 108. The commands 120 also can include commands 120 to the prospective host resource 112 to allocate resources for the application 108 and/or to begin execution of the application 108 when the application 108 is loaded to the resources.

Although not illustrated in FIG. 1, it should be understood that the host resource 110 can store state information before relocating the application 108, and can provide the state information to the prospective host resource 112 selected to host the relocated application 108. The host resource 110 can provide the state information to the prospective host resource 112, and the prospective host resource 112 can load the state information to the prospective host resource 112 before or upon executing the application 108. Thus, the relocated application 108 can operate in a manner that can be substantially identical to the operation of the application 108 prior to relocation. It should be understood that this example is illustrative and therefore should not be construed as being limiting in any way.

FIG. 1 illustrates one server computer 102, one network 104, one host resource 110, two prospective host resources 112, one resource monitor 116, and one data store 118. It should be understood, however, that various implementations of the operating environment 100 can include zero, one, or more than one server computer 102; zero, one, or more than one network 104; zero, one, or more than one host resource 110; zero, one, two, or more than two prospective host resources 112; zero, one, or more than one resource monitor 116; and/or zero, one, or more than one data store 118. As such, the illustrated embodiment should be understood as being illustrative, and should not be construed as being limiting in any way.

Figure 2:
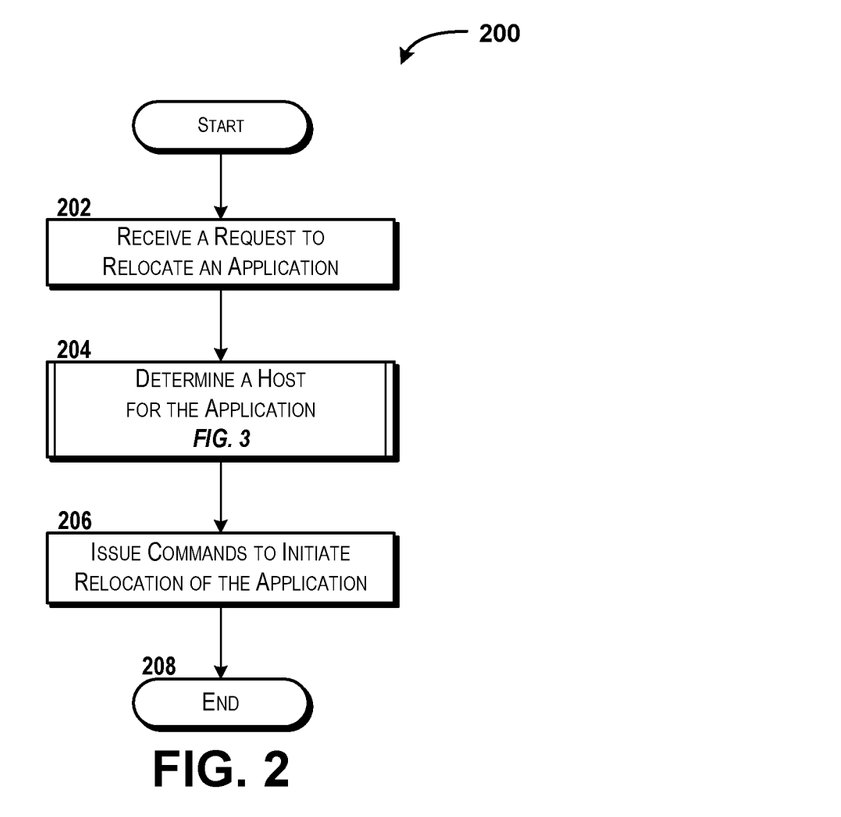
FIG. 2 is a flow diagram showing aspects of a method for initiating relocation of an application to optimize resource utilization, according to an illustrative embodiment of the concepts and technologies described herein.

Turning now to FIG. 2, aspects of a method 200 for initiating relocation of an application 108 to optimize resource utilization will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multi-processor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 to perform one or more operations and/or causing the processor to direct other components of the computing system or device to perform one or more of the operations.

For purposes of illustrating and describing the concepts of the present disclosure, the methods disclosed herein are described as being performed by the server computer 102 via execution of one or more software modules such as, for example, the relocation management application 106. It should be understood that additional and/or alternative devices and/or network nodes can provide the functionality described herein via execution of one or more modules, applications, and/or other software including, but not limited to, the relocation management application 106. Thus, the illustrated embodiments are illustrative, and should not be viewed as being limiting in any way.

The method 200 begins at operation 202. At operation 202, the server computer 102 can receive a request to relocate an application such as the application 108. The request to relocate the application 108 can be received from various sources and/or entities. In some embodiments, for example, the server computer 102 can receive a request from an entity such as a network operator or network engineer to relocate the application 108 from a first resource (e.g., the host resource 110) to a second resource (e.g., one of the prospective host resources 112). In some other embodiments, the server computer 102 can receive an instruction to provide the functionality illustrated and described herein in response to detecting a relocation process associated with the application 108.

In some other embodiments, the server computer 102 can receive the request as a function or service call. Thus, though not shown in FIG. 1, it should be understood that that the server computer 102 can be configured (via execution of the relocation management application 106) to expose an application programming interface ("API") to make the relocation management application 106 function as a callable service. It should be understood that this example is illustrative and therefore should not be construed as being limiting in any way.

From operation 202, the method 200 proceeds to operation 204. At operation 204, the server computer 102 can determine a host for the relocated application 108. Thus, in operation 204, the server computer 102 can identify a particular host that will execute the relocated application 108. The server computer 102 can identify the host from any number of hosts. Various details regarding the functionality of the server computer 102 for determining the host for the application 108 are illustrated and described in more detail below with reference to FIG. 3.

From operation 204, the method 200 proceeds to operation 206. At operation 206, the server computer 102 can initiate relocation of the application 108. According to various embodiments, the server computer 102 can issue one or more commands 120 to relocate the application 108. Thus, the server computer 102 can issue one or more commands 120 to the host resource 110 to cease execution of the application 108 and/or to release resources associated with the application 108. The server computer 102 also can issue one or more commands 120 to the identified resource such as one of the prospective host resources 112 to allocate resources and/or to begin execution of the application 108.

It can be appreciated that the commands 120 also can include commands for capturing state data, storing state data, and/or transmitting the state data from a host resource 110 to the prospective host resource 112 identified or determined in operation 204. Additionally, the commands 120 can include commands 120 for using the state data to resume execution of the relocated application 108 at the determined host, combinations thereof, or the like. It should be understood that this example is illustrative and therefore should not be construed as being limiting in any way.

From operation 206, the method 200 proceeds to operation 208. The method 200 ends at operation 208.

Figure 3:
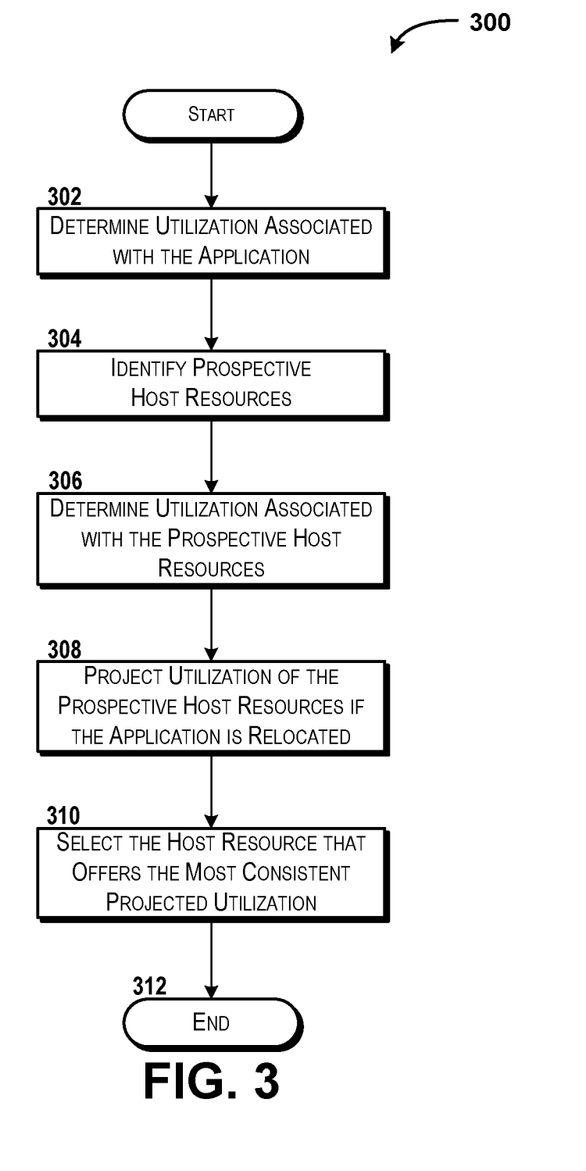
FIG. 3 is a flow diagram showing aspects of a method for determining a host for a relocated application, according to an illustrative embodiment of the concepts and technologies described herein.

Turning now to FIG. 3, aspects of a method 300 for determining a host for a relocated application 108 will be described in detail, according to an illustrative embodiment. It can be appreciated with reference to FIG. 2 that the operations illustrated and described herein with reference to FIG. 3 can be performed by the server computer 102 in conjunction with execution of operation 204 in FIG. 2. Because this is not necessarily the case, it should be understood that this example is illustrative and therefore should not be construed as being limiting in any way.

The method 300 begins at operation 302. At operation 302, the server computer 102 can determine a load or utilization associated with the application 108. As explained above, the load or utilization can include various performance metrics associated with the application 108 such as computing resource demands, storage resource demands, bandwidth demands, combinations thereof, or the like. The utilization associated with the application 108 can be determined based upon utilization data 114, for example. The utilization also can be determined by accessing a resource monitor 116 and receiving a response from the resource monitor 116, by querying a host resource such as the host resource 110 and receiving utilization information in response, by accessing utilization data 114 stored in the data store 118, combinations thereof, or the like. It can be appreciated that the host resource 110 that is queried by the server computer 102 can correspond to a host for the application 108. Because the server computer 102 can determine the utilization of the application 108 in additional and/or alternative manners, for example by querying or receiving data from other entities, it should be understood that these examples are illustrative and therefore should not be construed as being limiting in any way.

From operation 302, the method 300 proceeds to operation 304. At operation 304, the server computer 102 can identify one or more prospective host resources such as the prospective host resources 112 shown in FIG. 1. The prospective host resources 112 can be identified as host resources that have the ability and/or capacity to host and/or execute the application 108. Thus, for example, the prospective host resources 112 can be identified from a group of host resources based upon a determination that a throughput, bandwidth, processor requirements, memory requirements, and/or the like associated with the prospective host resources 112 are sufficient to host and/or execute the application 108. It should be understood that this example is illustrative and therefore should not be construed as being limiting in any way.

The prospective host resources 112 also can be determined based upon geographic locations of the prospective host resources 112, ownership of the prospective host resources 112, or the like. Thus, the server computer 102 can identify the prospective host resources 112 by searching a geographic location for resources, or the like, by receiving identifications of the prospective host resources 112, by querying a list of available host resources, combinations thereof, or the like. Because the prospective host resources 112 can be identified in additional and/or alternative manners, it should be understood that these examples are illustrative and therefore should not be construed as being limiting in any way.

From operation 304, the method 300 proceeds to operation 306. At operation 306, the server computer 102 can determine a utilization associated with each of the prospective host resources 112 identified in operation 304. Thus, operation 306 can correspond to the server computer 102 determining utilization availability associated with each of the prospective host resources 112. To provide the functionality illustrated with respect to operation 306, the server computer 102 can analyze utilization data 114 and/or other information that can reflect how much of various resources associated with the prospective host resources 112 is used and/or available.

Although not illustrated in FIG. 3, it should be understood that the server computer 102 can determine, after calculating a utilization for a prospective host resource 112, if another prospective host resource 112 exists. If the server computer 102 determines that another prospective host resource 112 exists, the server computer 102 can determine a utilization for the next prospective host resource 112. As such, it can be appreciated that the server computer 102 can repeat operation 306 of the method 300 until a utilization has been determined for each identified prospective host resource 112. It should be understood that this example is illustrative and therefore should not be construed as being limiting in any way.

From operation 306, the method 300 proceeds to operation 308. At operation 308, the server computer 102 can project, for each of the identified the prospective host resources 112, a utilization that would result from relocation of the application 108 to that prospective host resource 112. As such, operation 308 can correspond to the server computer 102 projecting how relocation of the application 108 to a particular prospective host resource 112 could or will affect utilization of that prospective host resource 112. As noted above, some embodiments of the concepts and technologies described herein can combine a utilization associated with the application 108 with a utilization associated with the prospective host resources 112. It should be understood that this example is illustrative and therefore should not be construed as being limiting in any way.

Although not illustrated in FIG. 3, it should be understood that the server computer 102 can determine, after calculating a projected utilization for a first prospective host resource 112, if another prospective host resource 112 exists. If the server computer 102 determines that another prospective host resource 112 exists, the server computer 102 can determine a projected utilization for the next prospective host resource 112. As such, it can be appreciated that the server computer 102 can repeat operation 308 of the method 300 until a projected utilization has been determined for each identified prospective host resource 112. It should be understood that this example is illustrative and therefore should not be construed as being limiting in any way.

From operation 308, the method 300 proceeds to operation 310. At operation 310, the server computer 102 can select the prospective host resource 112 that offers the most consistent predicted utilization. In some embodiments, the server computer 102 can calculate an average or mean utilization for the prospective host resource 112 based upon the projected utilization, and determine a deviation over time from the mean or average. The server computer 102 can be configured to identify a prospective host resource 112 that has a highest deviation from the mean or average as being the least favorable resource to host the relocated application 108.

Similarly, the server computer 102 can be configured to identify a prospective host resource 112 that has a lowest deviation from the mean or average as being the most favorable resource to host the relocated application 108. Because the most consistent projected utilization can be determined in additional and/or alternative manners, it should be understood that this example is illustrative and therefore should not be construed as being limiting in any way. The server computer 102 can be configured to consider all of the identified prospective host resources 112 and select the ideal host from that set of resources.

From operation 310, the method 300 proceeds to operation 312. The method 300 ends at operation 312.

Figure 4A:
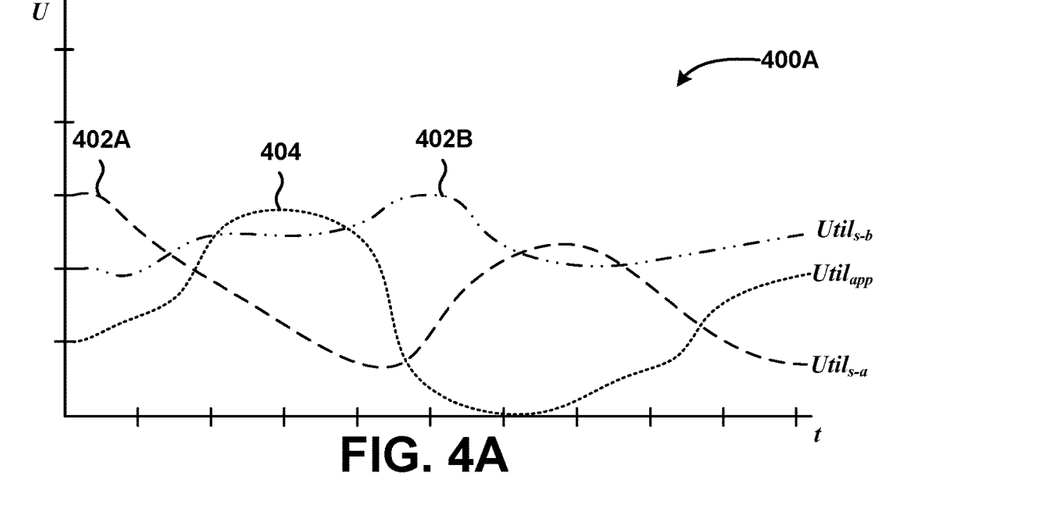
FIGS. 4A-4B are line drawings illustrating some aspects of projecting utilization of prospective host resources for an application, according to an illustrative embodiment of the concepts and technologies described herein.
Figure 4B:
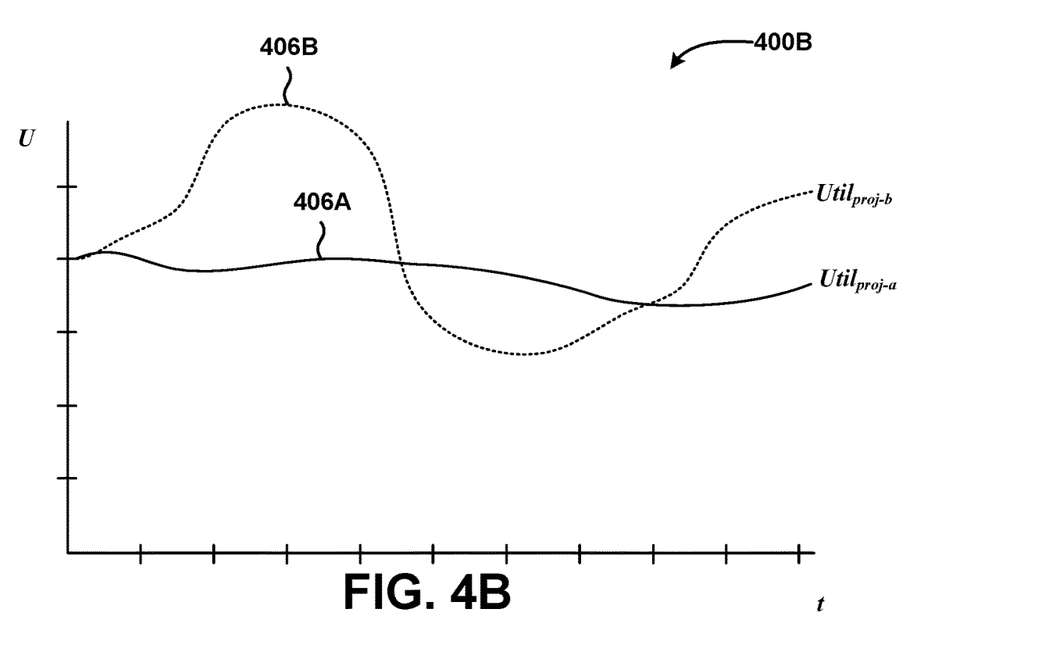

Turning now to FIGS. 4A-4B, additional aspects of the concepts and technologies described herein for relocation of applications 108 to optimize resource utilization will be illustrated and described in detail. In particular, FIGS. 4A-4B illustrate example graphs 400A, 400B for showing utilization U over time t. It should be understood that the example graphs 400A, 400B are illustrative and are provided to illustrate and describe additional aspects of the concepts and technologies described herein. As such, the example graphs 400A, 400B should be understood as being examples and should not be construed as being limiting in any way.

Referring first to FIG. 4A, the example graph 400A illustrates two server utilization lines 402A, 402B, and an application utilization line 404. The server utilization line 402A can correspond to server utilization or load over time for a first server, for example "server A," and can be determined and/or can reflect utilization data 114 as illustrated and described above. Thus, the server utilization line 402A is labeled as $Util_{s-a}$. It should be understood that this example is illustrative and therefore should not be construed as being limiting in any way.

Similarly, the server utilization line 402B can correspond to server utilization or load over time for a second server, for example "server B," and can be determined and/or can reflect utilization data 114 as illustrated and described above. Thus, the server utilization line 402B is labeled as $Util_{s-b}$. It should be understood that this example is illustrative and therefore should not be construed as being limiting in any way.

The application utilization line 404 can correspond to a utilization or load over time for a generic server that is hosting and/or executing an application 108. It can be appreciated that the application 108 for which utilization is depicted can correspond to an application 108 that is being considered for relocation as illustrated and described herein, though this is not necessarily the case. At any rate, the application utilization line 404 can be determined and/or can reflect utilization data 114 as illustrated and described above. Thus, the application utilization line 404 is labeled as $Util_{app}$. It should be understood that this example is illustrative and therefore should not be construed as being limiting in any way.

It can be appreciated with reference to FIG. 4A that the utilization of the application 108 can vary over time. Similarly, in the illustrated example, the server utilization $Util_{s-a}$ associated with the server called "server A" can vary over time. The server utilization $Util_{s-b}$ associated with the server called "server B" also can vary over time, but seemingly with less fluctuation than the server utilization associated with the server called "server A." Of course, this example is illustrative and should not be construed as being limiting in any way.

It can also be appreciated with reference to FIG. 4A that an actual utilization $Util_{s-a}$ of the server called "server A" may be higher at some points in time than the actual utilization $Util_{s-b}$ of the server called "server B." This, too, is illustrative and should not be construed as being limiting in any way. At any rate, the concepts and technologies described herein can be used to relocate applications 108 based upon an average utilization and/or to reduce fluctuation of a combined utilization of the applications 108 and prospective hosts, and therefore spikes in actual utilization may or may not be of importance when determining how to relocate applications 108. These and other aspects of the concepts and technologies described herein will be more clearly understood with reference to FIG. 4B.

Referring now to FIG. 4B, two projected utilization lines 406A, 406B are illustrated. The projected utilization line 406A can correspond to server utilization or load over time for a server, for example "server A," if the application 108 is relocated to that server. Of course, a resource being considered to host and/or execute a relocated application 108 may or may not be a server, so this example should not be construed as being limiting in any way. The projected utilization illustrated by the projected utilization line 406A can be based upon combining the server utilization line 402A and the application utilization line 404 along each point represented by data used to generate those lines. Thus, the projected utilization line 406A is labeled as $Util_{proj-b}$. Because the projected utilization line 406A and/or the underlying data can be determined in additional and/or alternative manners, it should be understood that this example is illustrative and therefore should not be construed as being limiting in any way.

Similarly, the projected utilization line 406B can correspond to server utilization or load over time for a server, for example "server B," if the application 108 is relocated to that server. The projected utilization illustrated by the projected utilization line 406B can be based upon combining the server utilization line 402B and the application utilization line 404 along each point represented by data used to generate those lines. Thus, the projected utilization line 406B is labeled as $Util_{proj-b}$. Because the projected utilization line 406B and/or the underlying data can be determined in additional and/or alternative manners, it should be understood that this example is illustrative and therefore should not be construed as being limiting in any way.

As can be appreciated with reference to the graph 400B shown in FIG. 4B, the projected utilization line 406B has less fluctuation than the projected utilization line 406A. This is evident from the relative consistency (in terms of utilization) of the projected utilization line 406B. Meanwhile, the projected utilization line 406A fluctuates up and down (in terms of utilization) to a greater degree than the projected utilization line 406B. Thus, of these two options, namely relocating the application 108 to the server called server A or the server called server B, the best option would be using the server called server B as this server provides a more consistent load than the server called server A. In particular, if an average value for the utilization depicted by the projected utilization line 406B is determined, the deviation of the projected utilization line 406B from that average may be greater than a deviation from the projected utilization line 406A from the average projected utilization. It should be understood that this example is illustrative and therefore should not be construed as being limiting in any way.

Thus, while it may seem counterintuitive that the server called server B is a better option for relocation of the application 108 than the server called server A, because of the fact that the actual utilization of server B spikes higher than the actual utilization of server A at some times, the concepts and technologies described herein can suggest the use of the server called server B instead of the server called server A.

As explained above, the server called server B can be chosen because that server may give a more consistent utilization over time with less fluctuation than server A. According to various embodiments of the concepts and technologies described herein, network planning may be more difficult when loads and/or utilizations fluctuate than when overall loads or utilizations are high because of the need for elastic load requirements, scaling, and the like. Scaling can cost more in terms of computing power, bandwidth, and/or storage resources than merely instantiating a server or other resource with a particular capacity (high or low). Thus, embodiments of the concepts and technologies described herein can be configured to exercise a preference for consistency in load and/or utilization over an overall or average load or consistency. It should be understood that this example is illustrative and therefore should not be construed as being limiting in any way.

Figure 5:
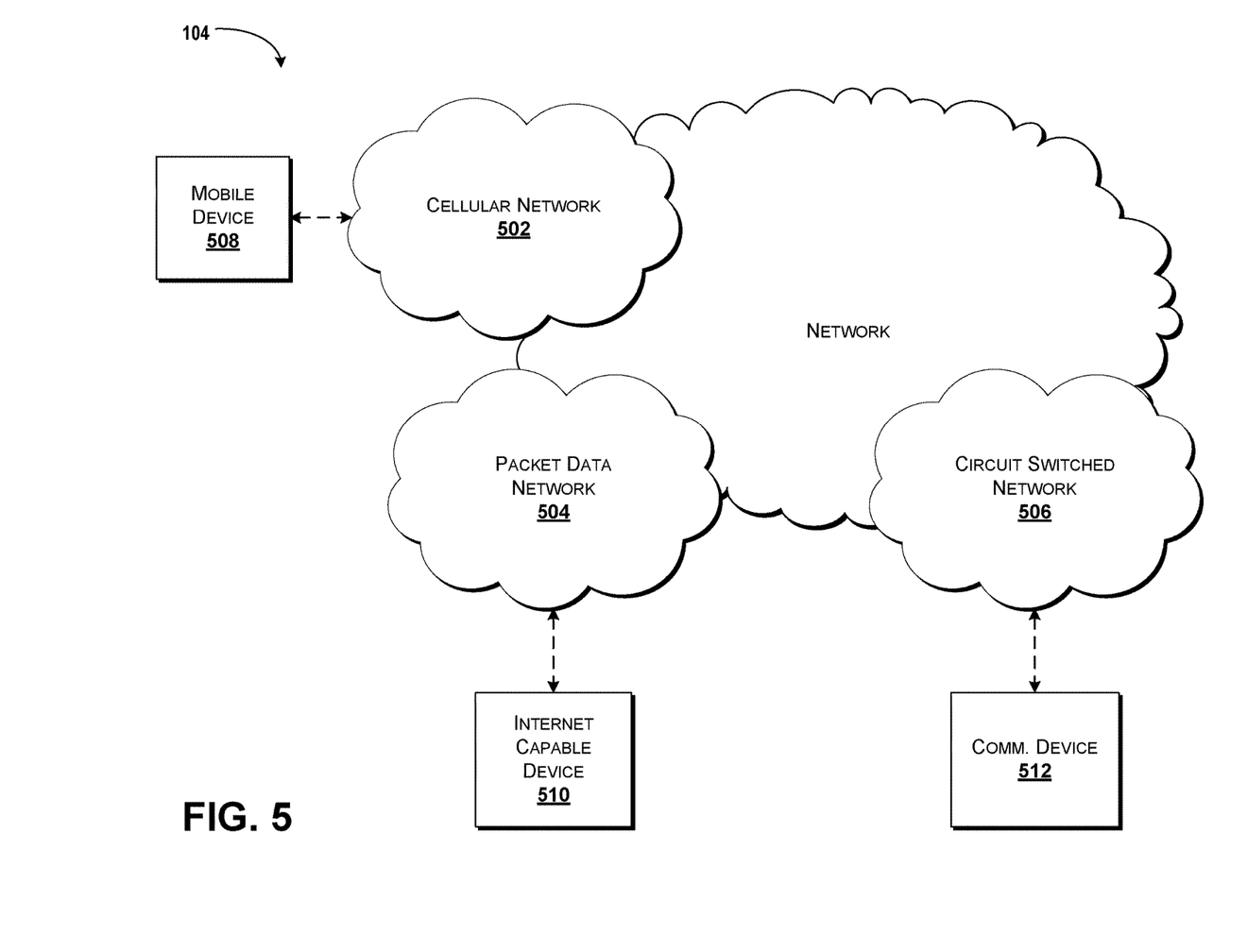
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
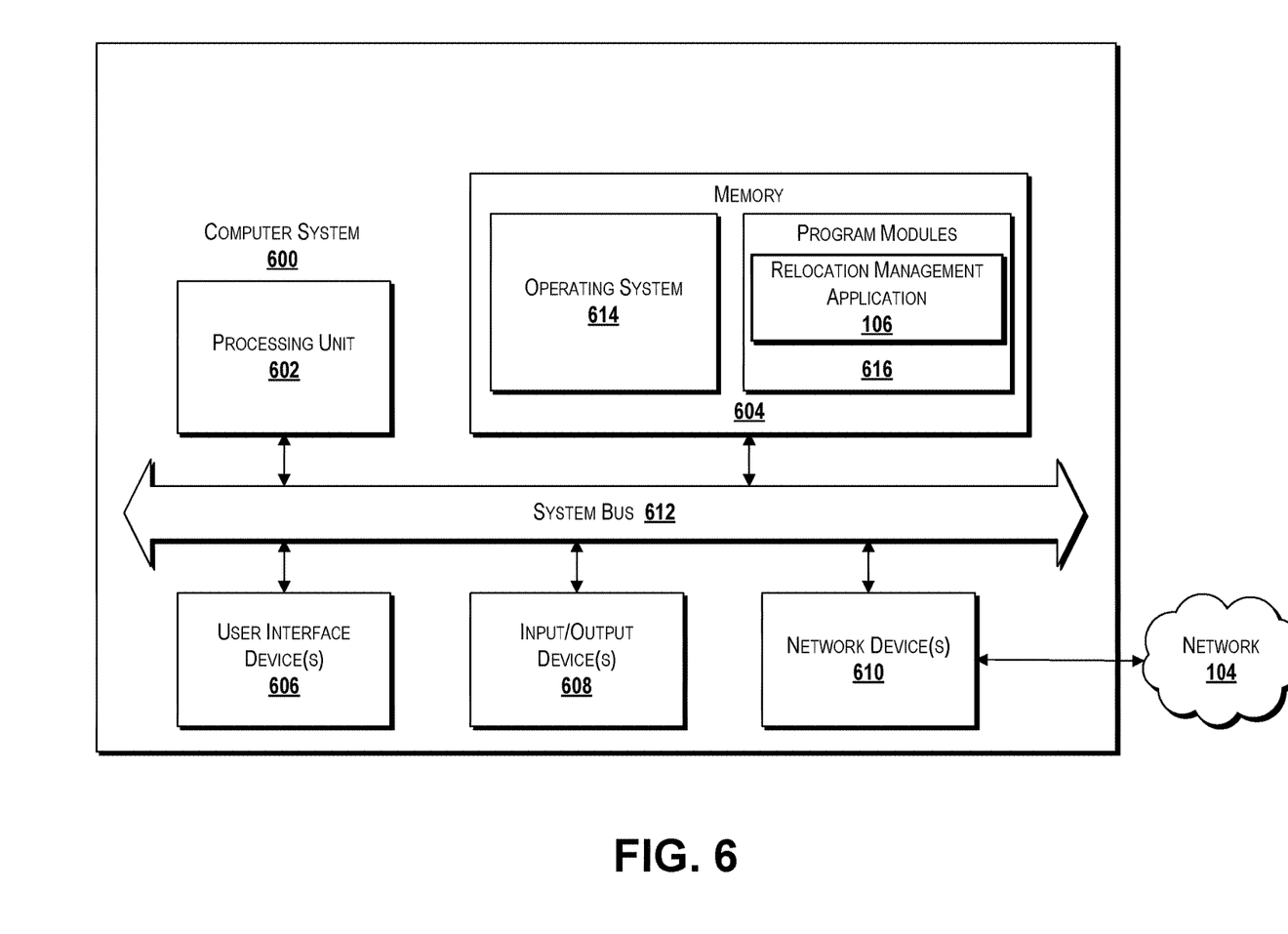
FIG. 6 is a block diagram illustrating an example computer system configured to provide relocation of applications to optimize resource utilization, according to some illustrative embodiments of the concepts and technologies described herein.

FIG. 6 is a block diagram illustrating a computer system 600 configured to provide the functionality described herein for relocation of applications to optimize resource utilization, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the relocation management application 106. This and/or other programs can be embodied in computer-readable media containing instructions that, when executed by the processing unit 602, perform one or more of the methods 200, 300 described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the application 108, the utilization data 114, the commands 120, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for relocating applications to optimize resource utilization have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   identifying, by a processor, prospective host resources capable of hosting an application, wherein the prospective host resources comprise a first prospective host resource and a second prospective host resource;
   projecting, by the processor, a first average projected utilization based on an application utilization of the application and a first utilization of the first prospective host resource, the first average projected utilization indicating an average of an expected utilization of the first prospective host resource over a time if the application is relocated to the first prospective host resource;
   projecting, by the processor, a second average projected utilization based on the application utilization and a second utilization of the second prospective host resource, the second average projected utilization indicating an average of an expected utilization of the second prospective host resource over the time if the application is relocated to the second prospective host resource;
   determining, by the processor, a first total deviation from the first average projected utilization for the first prospective host resource;
   determining, by the processor, a second total deviation from the second average projected utilization for the second prospective host resource; and
   in response to a determination that the first total deviation is less than the second total deviation, issuing, by the processor, a command to relocate the application to the first prospective host resource.

2. The method of claim 1, wherein the application is executed by a host resource, and wherein the application utilization comprises a utilization of the host resource.

3. The method of claim 1, wherein the command comprises a first command that is issued to a host resource that executes the application.

4. The method of claim 3, wherein the first command causes the host resource to store state information associated with execution of the application and to transmit the state information to the first prospective host resource.

5. The method of claim 4, further comprising:
   issuing a second command to the first prospective host resource, wherein the second command causes the first prospective host resource to use the state information to resume execution of the application.

6. The method of claim 1, wherein a second fluctuation of utilization associated with the second utilization is greater than a first fluctuation of utilization associated with the second utilization.

7. The method of claim 1, wherein the first total deviation from the first average projected utilization indicates a fluctuation in projected utilization over time if the application is relocated to the first prospective host resource.

8. The method of claim 1, wherein a first actual utilization of the first prospective host resource at a point in time exceeds a second actual utilization of the second prospective host resource at the point in time.

9. A system comprising:
   a processor; and
   a memory that stores computer-executable instructions that, when executed by the processor, cause the processor to perform operations comprising
   identifying prospective host resources capable of hosting an application, wherein the prospective host resources comprise a first prospective host resource and a second prospective host resource,
   projecting a first average projected utilization based on an application utilization of the application and a first utilization of the first prospective host resource, the first average projected utilization indicating an average of an expected utilization of the first prospective host resource over a time if the application is relocated to the first prospective host resource,
   projecting a second average projected utilization based on the application utilization and a second utilization of the second prospective host resource, the second average projected utilization indicating an average of an expected utilization of the second prospective host resource over the time if the application is relocated to the second prospective host resource,
   determining a first total deviation from the first average projected utilization for the first prospective host resource,
   determining a second total deviation from the second average projected utilization for the second prospective host resource, and
   in response to a determination that the first total deviation is less than the second total deviation, issuing a command to relocate the application to the first prospective host resource.

10. The system of claim 9, wherein the application is executed by a host resource, and wherein the application utilization comprises a utilization of the host resource.

11. The system of claim 9, wherein the command comprises a first command that is issued to a host resource that executes the application.

12. The system of claim 11, wherein the computer-executable instructions, when executed by the processor, cause the processor to perform operations further comprising:
   issuing a second command to the first prospective host resource, wherein the first command causes the host resource to store state information associated with execution of the application and to transmit the state information to the first prospective host resource, and wherein the second command causes the first prospective host resource to use the state information to resume execution of the application.

13. The system of claim 9, wherein a second fluctuation of utilization associated with the second utilization is greater than a first fluctuation of utilization associated with the second utilization.

14. The system of claim 9, wherein the first total deviation from the first average projected utilization indicates a fluctuation in projected utilization over time if the application is relocated to the first prospective host resource.

15. The system of claim 9, wherein a first actual utilization of the first prospective host resource at a point in time exceeds a second actual utilization of the second prospective host resource at the point in time.

16. A computer storage medium having computer-executable instructions stored thereon that, when executed by a processor, cause the processor to perform operations comprising:
   identifying prospective host resources capable of hosting an application, wherein the prospective host resources comprise a first prospective host resource and a second prospective host resource;

projecting a first average projected utilization based on an application utilization of the application and a first utilization of the first prospective host resource, the first average projected utilization indicating an average of an expected utilization of the first prospective host resource over a time if the application is relocated to the first prospective host resource;

projecting a second average projected utilization based on the application utilization and a second utilization of the second prospective host resource, the second average projected utilization indicating an average of an expected utilization of the second prospective host resource over the time if the application is relocated to the second prospective host resource;

determining a first total deviation from the first average projected utilization for the first prospective host resource;

determining a second total deviation from the second average projected utilization for the second prospective host resource; and in response to a determination that the first total deviation is less than the second total deviation, issuing a command to relocate the application to the first prospective host resource.

17. The computer storage medium of claim 16, wherein the application is executed by a host resource, and wherein the application utilization comprises a utilization of the host resource.

18. The computer storage medium of claim 16, wherein a second fluctuation of utilization associated with the second utilization is greater than a first fluctuation of utilization associated with the second utilization.

19. The computer storage medium of claim 16, wherein the first total deviation from the first average projected utilization indicates a fluctuation in projected utilization over time if the application is relocated to the first prospective host resource.

20. The computer storage medium of claim 16, wherein a first actual utilization of the first prospective host resource at a point in time exceeds a second actual utilization of the second prospective host resource at the point in time.

* * * * *